United States Patent [19]
Lin

[11] Patent Number: 5,695,790
[45] Date of Patent: Dec. 9, 1997

[54] MOLD ASSEMBLY FOR INJECTION MOLDING

[75] Inventor: Casio Lin, Taipei, Taiwan

[73] Assignee: Cosmos-Tooling Precision Industrial Co., Ltd., Taoyuan Hsien, Taiwan

[21] Appl. No.: 557,238

[22] Filed: Nov. 14, 1995

[51] Int. Cl.$^6$ ............................................. B29C 45/17
[52] U.S. Cl. .............. 425/190; 425/192 R; 425/441; 425/451.9; 249/160; 249/186
[58] Field of Search ........................ 425/190, 192 R, 425/443, 451.9, 556; 249/160, 186

[56] References Cited

U.S. PATENT DOCUMENTS

| | | | |
|---|---|---|---|
| 3,534,443 | 10/1970 | Tucker | 425/443 |
| 3,564,660 | 2/1971 | Darnell | 425/192 |
| 3,853,452 | 12/1974 | Delmonte | 425/450.1 |
| 4,202,522 | 5/1980 | Hanas et al. | 425/192 R |
| 4,383,819 | 5/1983 | Letica | 425/556 |
| 4,676,475 | 6/1987 | Grandin et al. | 249/160 |
| 4,731,014 | 3/1988 | Von Holdt | 425/556 |

*Primary Examiner*—Jay H. Woo
*Assistant Examiner*—Iurie A. Schwartz
*Attorney, Agent, or Firm*—Bacon & Thomas

[57] ABSTRACT

A mold assembly for injection molding including a female mold having a first pair of opposite inside walls and a second pair of opposite inside walls disposed at four sides and defining a trapezoidal cavitys two trapezoidal locating plates respectively fastened to the first pair of opposite inside walls inside the female mold, and defining two symmetrical pairs of sliding ways within the female mold at different elevations between the trapezoidal locating plates and the second pair of opposite inside walls, and a mold set fitting the trapezoidal cavity of the mold set, the female mold consisting of a left mold half and a right mold half detachably abutted together, each mold half having two sliding tongues at different elevations and slidably fitted into the sliding ways.

4 Claims, 5 Drawing Sheets

MOLD ASSEMBLY FOR INJECTION MOLDING

BACKGROUND OF THE INVENTION

Using an injection molding mold for molding products from plastics has been well developed. An injection molding mold is suitable for mass production of plastic articles. FIG. 1 shows a mold assembly for plastic injection molding. The mold assembly is comprised of a female mold 10 and a male mold 20. When the female mold 10 and the male mold 20 are fastened together, molten plastic is filled into the cavity defined within the female mold 10. When the shape is formed, the male mold 20 is separated from the female mold 10, and the injection-molded article is removed from the mold assembly. The female mold 10 has for example one pair of symmetrical slanting slots 101 for mounting a respective pair of guide rods 30. The male mold 20 consists of two symmetrical parts, each having a slanting sliding hole 201 coupled to one guide rod 30. Through the guide rods 30, the two symmetrical parts of the male mold 20 can be quickly guided into engagement with the female mold 10, or separated from the female mold 10 for the removal of the injection-molded article. This structure of mold assembly is functional, however its manufacturing process is complicated and, its service life is short. Because the slanting slots 101 and the slanting sliding holes 201 respectively slope in one direction, it is difficult to keep the slanting slots 101 and the slanting sliding holes 201 in a perfectly parallel relation during the processing process. Any small error on the positions of the slanting slots 101 and the slanting sliding holes 201 will cause the slanting sliding holes 201 to be unable to perfectly match with the guide rods 30. If the slanting sliding holes 201 and the guide rods 30 are not perfectly matched, the male mold 20 cannot be positively closed on the female mold 10, and the mold assembly tends to be damaged when forced into position by pressure. Furthermore, because the guide rods 30 are partially suspended outside the female mold 10, they tend to deform.

SUMMARY OF THE INVENTION

The present invention has been accomplished to provide a mold assembly for injection molding which eliminates the aforesaid drawbacks. According to one aspect of the present invention, the mold assembly comprises a female portion having a first pair of opposite inside walls and a second pair of opposite inside walls disposed at four sides and defining a trapezoidal cavity; two trapezoidal locating plates respectively fastened to the first pair of opposite inside walls inside the female mold, and defining two symmetrical pairs of sliding ways within the female portion at different elevations between the trapezoidal locating plates and the second pair of opposite inside walls; and a mold set fitting into the trapezoidal cavity of the female portion, the mold set consisting of a left mold half and a right mold half detachably abutted together, each mold half having two sliding tongues at different elevations and slidably fitted into the sliding ways. According to another aspect of the present intention, the locating plates are respectively fastened to the first pair of opposite inside walls of the female portion by tongue-and-groove joints, and then fixedly secured in place by screws.

DETAILED DESCRIPTION OF THE PREFERRED EMBODIMENT

Figure 1:
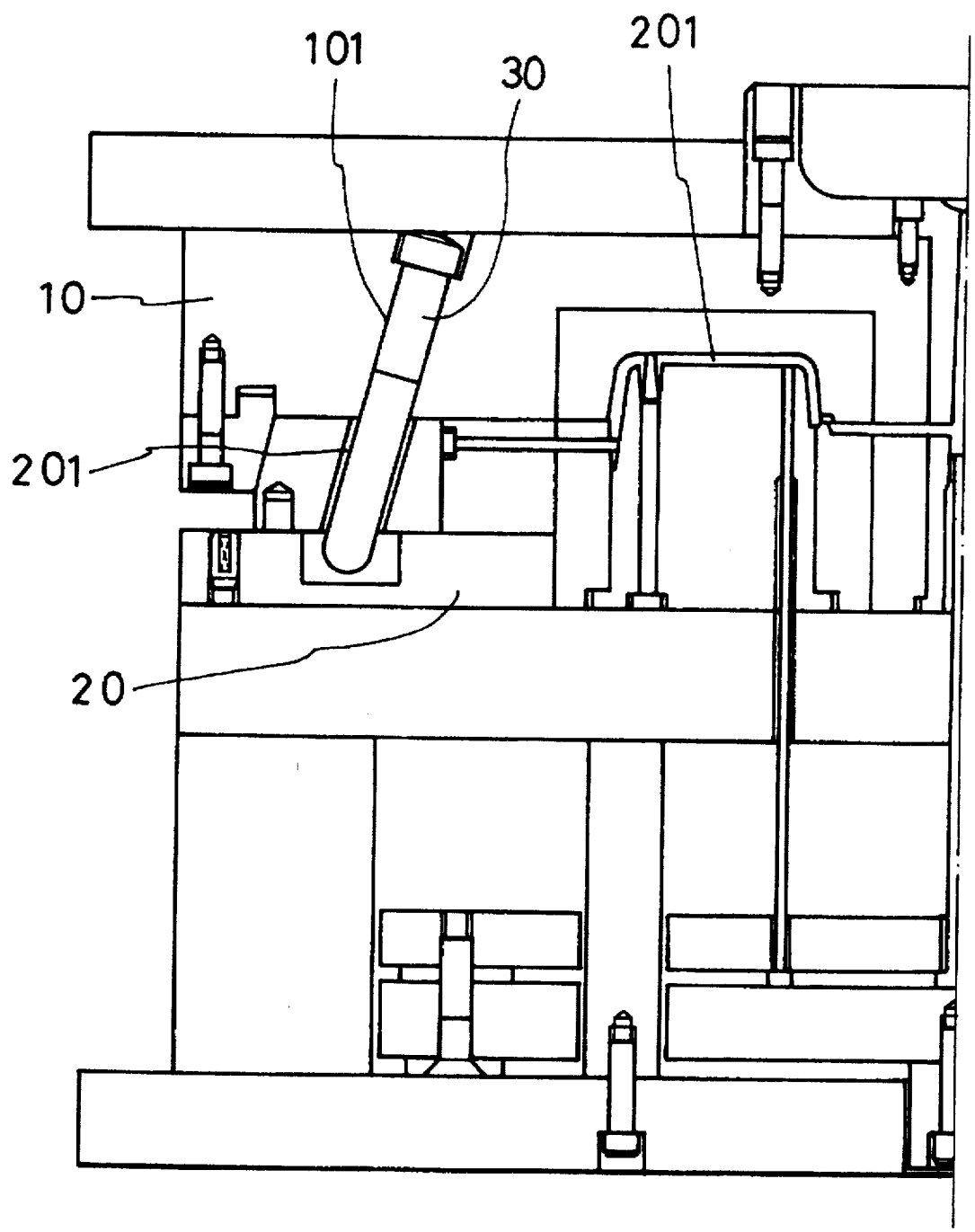
FIG. 1 is a sectional view of a mold assembly for plastic injection molding according to the prior art.
Figure 2:
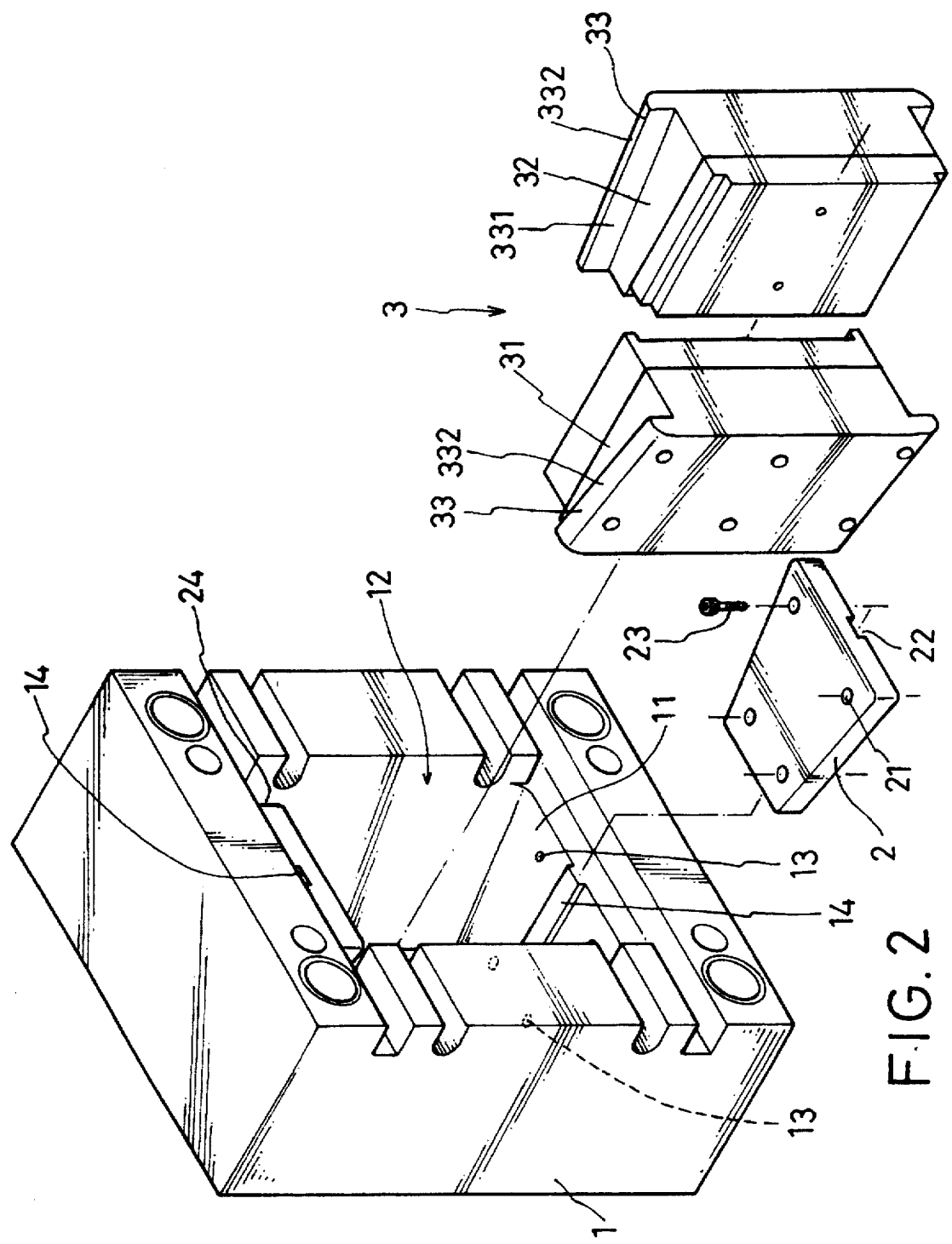
FIG. 2 is an exploded view of a mold assembly for plastic injection molding according to the present invention.
Figure 3:
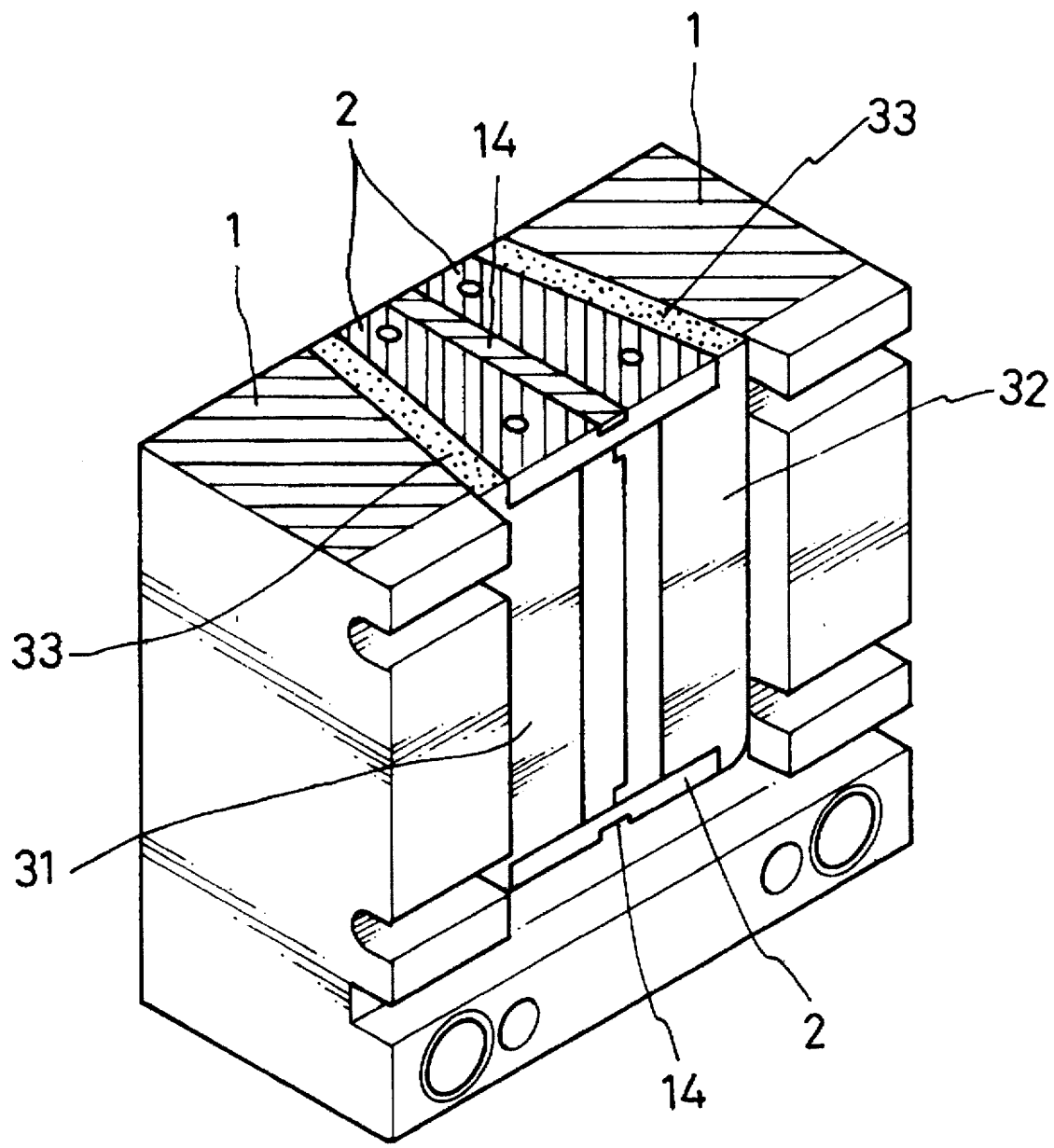
FIG. 3 is a cutaway of the mold assembly shown in FIG. 2.
Figure 4:
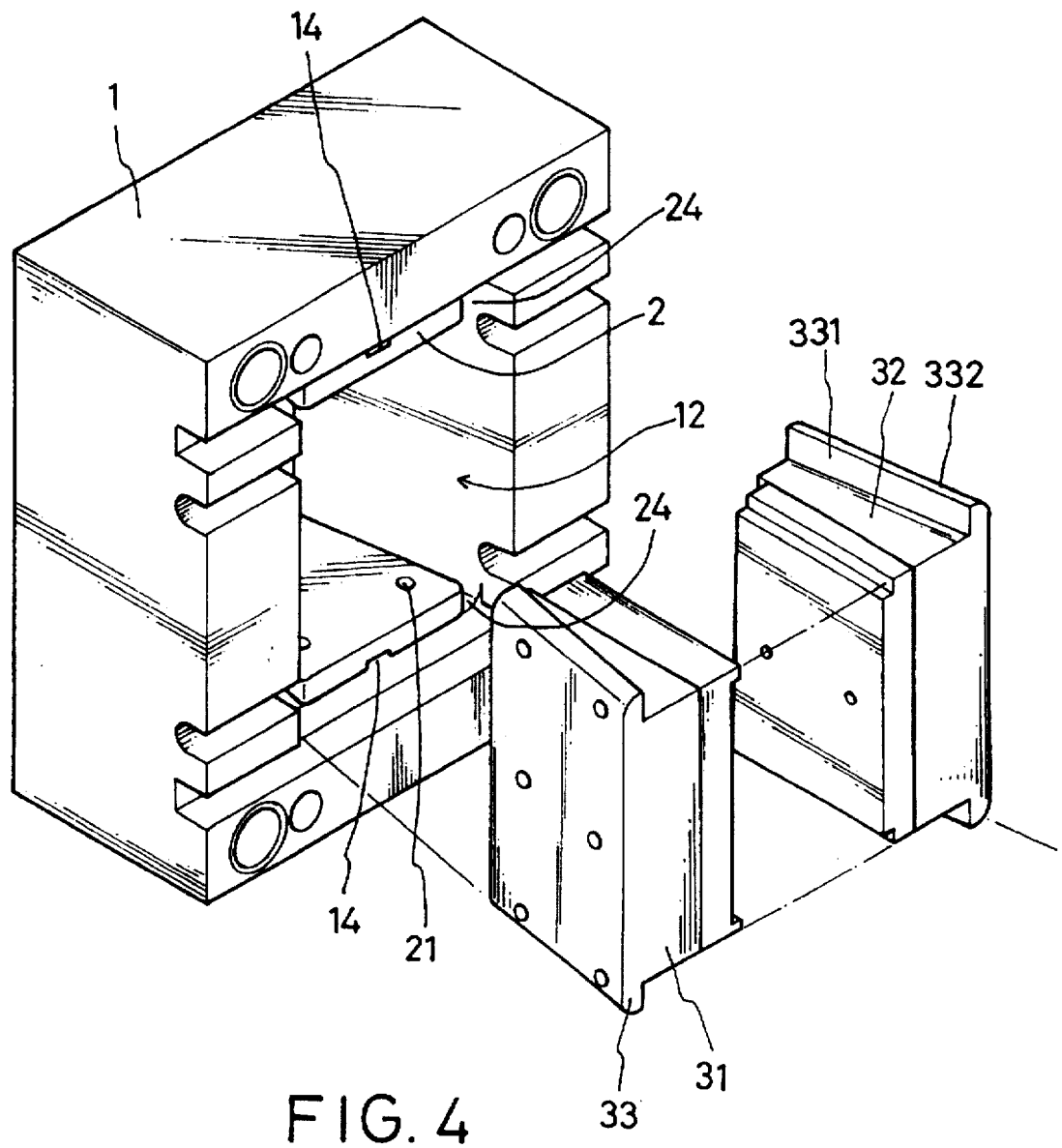
FIG. 4 shows the locating plates fixed to the inside of the female portion, and the male mold removed from the female mold according to the present invention.
Figure 5:
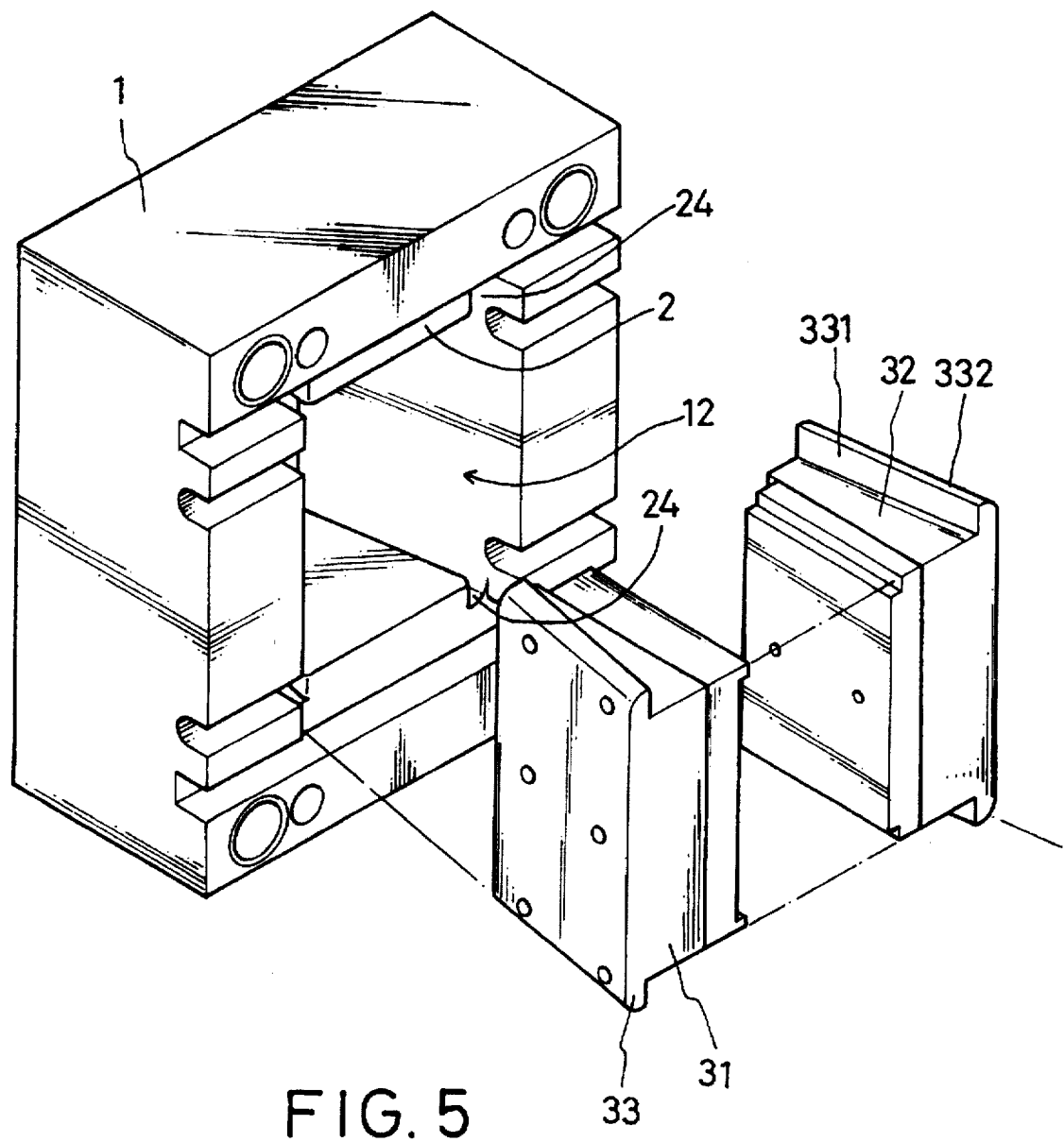
FIG. 5 is an exploded perspective view showing an alternative embodiment of the female portion of the present invention.

Referring to FIGS. 2, 3, and 4, a mold assembly for injection molding in accordance with the present invention is generally comprised of a female portion 1, two locating plates 2, and a mold set 3. The female portion 1 has four inside walls 11 at the four sides defining a trapezoidal Cavity 12, which receives the mold set 3. Symmetrical tie holes 13 and longitudinal rails 14 are respectively made on two opposite inside walls 11 of the female portion 1 for mounting the locating plates 2. The locating plates 2 are made of a trapezoidal shape fitting within the respective inside walls 11 but of relatively smaller width, each having a plurality of tie holes 21 and a longitudinal groove 22. When the locating plates 2 are fastened to the respective inside walls 11 of the female portion 1, the longitudinal grooves 22 are respectively engaged with the longitudinal rails 14, and then the tie holes 21 of the locating plates 2 are respectively fastened to the tie holes 13 of the respective inside walls 11 of the female mold 1 by respective screws 23. When the locating plates 2 are installed, two symmetrical pairs of sliding ways 24 are bilaterally defined within the female mold 1 at different elevations for slidably mounting the mold set 3. The mold set 3 is adapted for insertion into the trapezoidal cavity 12 and comprises a left mold half 31 and a right mold half 32 abutted together, each mold half 31 and 32 having two sliding tongues 33 at different elevations for slidably fitting into the sliding ways 24. Each of the sliding tongues 33 has a straight inner side 331, which is disposed in contact with one lateral side of one locating plate 2 when the sliding tongues 33 are respectively fitted into the sliding ways 24, and a chamfered outer edge 332, which facilitates the sliding of the respective sliding tongue 33 in the respective sliding way 24.

Referring to FIG. 3 again, when the tongues 33 of the mold set 3 are respectively inserted into the sliding ways 24, the left mold half 31 and the right mold half 32 are abutted together and retained inside the trapezoidal cavity 12 of the female portion 1, and the injection molding process can then be performed. After the injection molding process, the left mold half 31 and the right mold half 32 can be conveniently removed from the female portion 1. When the tongues 33 of the mold set 3 are disconnected from the sliding ways 24, the left mold half 31 and the right mold half 32 are separated from each other, and the injection-molded article can than be taken out.

As an alternate form of the present invention, the locating plates 2 can be integrally made on the two opposite inside walls of the female mold 1.

It is to be understood that the drawings are designed for purposes of illustration only, and are not intended as a definition of the limits and scope of the invention disclosed.

I claim:

1. A mold assembly for injection molding, comprising:
   a female portion having a first pair of opposite inside walls and a second pair of opposite inside walls together defining a trapezoidal cavity;

a trapezoidal locating plate respectively located on each of said first pair of opposite inside walls inside said female portion so as to define two symmetrical pairs of sliding ways within said trapezoidal cavity between said trapezoidal locating plates and said second pair of opposite inside walls; and a mold set fitting in the trapezoidal cavity of said female mold, said mold set comprising a left mold half and a right mold half detachably abutted together, each mold half having two sliding tongues slidably fitted into two of said sliding ways.

2. The mold assembly of claim 1 further comprising: a longitudinal rail located on each of the first pair of opposite inside walls of said female portion; and, a longitudinal groove in each of said locating plates engaged with the longitudinal rail of the respective inside wall of said female portion.

3. The mold assembly of claim 1 wherein each of the sliding tongues of the mold halves of said mold set has a straight inner side disposed in contact with one lateral side of one locating plate, and a chamfered outer edge, which facilitates the sliding of the respective sliding tongue in the respective sliding way.

4. The mold assembly of claim 1 wherein said locating plates are integrally formed on the first pair of inside walls of said female mold.

* * * * *